United States Patent [19]

Kooiman

[11] Patent Number: 5,046,791
[45] Date of Patent: Sep. 10, 1991

[54] EXTRUSION FRAME AND COMPONENTS THEREFOR

[76] Inventor: Jerry Kooiman, 27 Moncrieff Drive, Rexdale, Ontario, Canada, M9W 2P9

[21] Appl. No.: 549,633

[22] Filed: Jul. 6, 1990

Related U.S. Application Data

[63] Continuation of Ser. No. 339,700, Apr. 18, 1989, abandoned.

[51] Int. Cl.⁵ ............................................. A47B 47/00
[52] U.S. Cl. ................................... 312/265.1; 52/731
[58] Field of Search ................ 312/257.1, 263, 265.1, 312/265.3, 265.4, 265.5, 265.6, 265.2, 140; 52/731, 732; 403/401, 402; 40/155

[56] References Cited

U.S. PATENT DOCUMENTS

| | | | |
|---|---|---|---|
| 2,963,131 | 12/1960 | Brockway | 52/732 |
| 3,147,518 | 9/1964 | Horgan, Jr. | 52/731 |
| 3,345,794 | 10/1967 | Proud | 52/731 |
| 3,486,288 | 12/1969 | Pyne | 52/732 |
| 3,525,560 | 8/1970 | Gasner et al. | 312/263 |
| 3,686,805 | 8/1972 | Pofferi | 52/506 |
| 3,698,114 | 10/1972 | Hirsch et al. | 40/155 |
| 3,881,287 | 5/1975 | Biebuyck | 52/732 |
| 3,912,111 | 10/1975 | Marengoni | 312/140 |
| 4,006,573 | 2/1977 | Biebuyck | 52/732 |
| 4,126,364 | 11/1978 | Reilly | 312/140 |
| 4,428,135 | 1/1984 | Sobel | 403/402 |
| 4,463,057 | 7/1984 | Knurr | 52/731 |
| 4,689,933 | 9/1987 | Biro | 52/731 |
| 4,744,612 | 5/1988 | Winter et al. | 312/263 |
| 4,768,845 | 9/1988 | Yeh | 312/257.1 |

FOREIGN PATENT DOCUMENTS

| | | |
|---|---|---|
| 908384 | 8/1972 | Canada . |
| 977521 | 11/1975 | Canada . |
| 1056897 | 6/1979 | Canada . |
| 1223426 | 6/1987 | Canada . |

Primary Examiner—Kenneth J. Dorner
Assistant Examiner—Brian K. Green
Attorney, Agent, or Firm—Ridout & Maybee

[57] ABSTRACT

An extrusion for framing cabinetry and the like having at least one tandem channel configuration comprising an inner channel for receiving connecting elements and an outer channel for receiving ribs from an accessory strip. Accessory strips of various configurations are also provided. Through the use of the tandem channel configuration such accessory strips can be engaged to extruded frame components in a snap-fit relation that resists dislodgement, providing virtually unlimited variations in framing components utilizing a finite set of extruded frame components and accessory strips.

15 Claims, 5 Drawing Sheets

EXTRUSION FRAME AND COMPONENTS THEREFOR

This application is a continuation of application Ser. No. 339,700, filed Apr. 18, 1989, now abandoned.

FIELD OF THE INVENTION

The present invention relates to an extrusion frame for cabinets and the like and accessories therefor.

In particular, the present invention relates to a versatile extrusion frame for cabinets and the like combining various channels suitable for different purposes, in which certain channels are arranged to form inner and outer channels to provide a particularly advantageous means for interconnecting components of an extrusion frame and mounting accessories thereon.

BACKGROUND OF THE INVENTION

Aluminum extrusion framework has become a popular means for framing cabinetry, for example retail display cases and the like. Such extrusions lend themselves to durable and versatile forms for components which can be relatively easily assembled.

A typical retail display cabinet may require frame components adapted to receive glass, wood, plastic or metal panels, sliding or hinged doors and other components. Additionally, frame components for this purpose must be capable of interconnecting in various ways to form a sturdy framing structure which is aesthetically appealing. This has been accomplished in two ways.

First, a separate extrusion frame component is designed to be specifically adapted to perform each particular function in a display case. For example, one frame component may be extruded with a glazing channel, another may be extruded with tracks for slidably receiving doors, still another with runners for mounting a sliding component on wheels. A separate frame component having only plane surfaces for aesthetic appeal may also be desirable for portions of the frame in which no accessory is required. Given all of the possible features which such cabinets might incorporate, it becomes expensive and onerous to extrude a frame component of different configuration to perform each particular function.

Alternatively, extrusion frame components capable of interconnecting to form a sturdy frame may be combined with accessories made of plastic or the like for performing the various functions required in the display case. In this situation, the frame components can be relatively similar, and plastic or other accessory strips which adapt particular parts of the frame to perform particular functions are affixed to the frame components by means of double-sided adhesive tape, epoxy or the like. Affixing the accessory strips to the frame components in this manner requires careful attention in order to ensure that all accessory strips are properly aligned in the finished frame, particularly at points where the end of one strip abuts the end of another. Moreover, known adhesion means for adhering such accessory strips to aluminum extrusion frame components are rarely permanent, particularly where moving parts are involved, and an accessory strip is likely to become separated from the associated frame component resulting in loss in functionality and deterioration of aesthetic appeal.

Channels provided in the frame components for receiving connecting members might be utilized to receive such accessory strips in interlocking fashion, however in order to achieve a snug fit for a rigid frame both connecting elements and the interlocking means of the accessory strips must be adapted to be received in the channels to a close tolerance. Accordingly, wherever a portion of a channel is occupied by connecting elements it is not available for receiving interlocking means from a plastic accessory. The plastic accessory would therefore have to be manually modified so that its interlocking means would not interfere with the connecting element in the channel of the frame component. This can be a laborious task, and in the end will result in points, generally at corners, where the plastic accessory is not snugly secured to the frame component because of the interfering connecting element.

The present invention provides an extrusion frame component which overcomes these disadvantages by providing a tandem channel configuration, comprising inner and outer channels, within each frame component. The inner channel is adapted to snugly receive connecting elements to form a rigid frame for the display case, and the outer channel is adapted to snugly receive interlocking members depending from an accessory strip in snap-fit relation. A set of relatively similar frame components incorporating the tandem channel configuration of the present invention is sufficient to construct cabinetry having virtually any known feature, by utilizing accessory strips of various configurations.

Interlocking means depending from a plastic accessory do not interfere with the connecting elements of the frame components, and yet are snugly retained in the outer channel of a frame component along its entire length, either releasably or permanently. Accessory strips affixed to the frame components in this fashion are necessarily properly aligned because the inner channels of abutting frame components are held in alignment by a connecting element, resulting in automatic alignment of the associated outer channels.

In a preferred embodiment of the present invention interlocking means depending from an accessory strip are not congruent, requiring that one side of the interlocking means be inserted into the outer channel of the frame component prior to snapping the other side of the interlocking means into the channel, thereby further reducing the possibility of separation of any portion of the accessory strip from the frame component.

For versatility, the frame components may provide varying numbers and orientations of the tandem channel arrangement, for use variously as outer frame members, inner frame members or dividers and frame members for cabinets of unique or unusual configuration. Additional channels of varying configurations may be provided to increase the versatility of the frame components, as will be described in greater detail below.

SUMMARY OF THE INVENTION

The present invention provides an extrusion for framing cabinetry and the like comprising at least one tandem channel configuration having an inner channel adapted to receive an arm of a connecting element and an outer channel adapted to receive interlocking means from an accessory strip.

The present invention further provides an accessory strip for mounting on an extrusion frame component having interlocking means comprising a pair of longitudinally extending ribs including flanges depending therefrom, in which one flange is a blunted flange and the other flange is barb-shaped.

The present invention further provides the combination of an extrusion frame component for framing cabinetry and the like having at least one tandem channel configuration comprising an inner channel for receiving a connecting element and an outer channel for receiving interlocking means from an accessory strip, and an accessory strip having interlocking means comprising a pair of longitudinally extending ribs having flanges and adapted to interlock with the outer channel in snap fit relation.

BRIEF DESCRIPTION OF THE DRAWINGS

In drawings which illustrate by way of example only preferred embodiments of the invention.

DETAILED DESCRIPTION OF THE INVENTION

Figure 1:
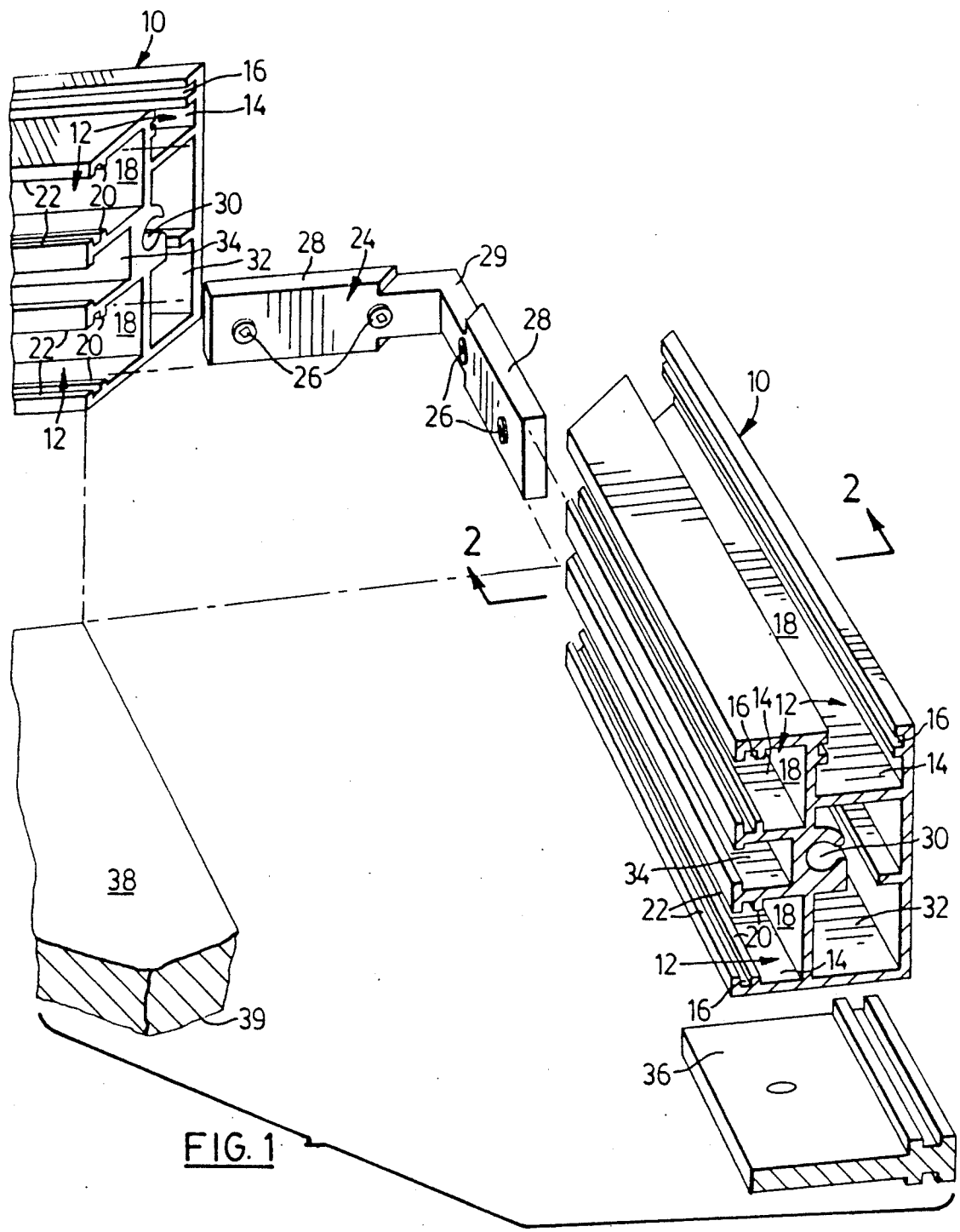
FIG. 1 is an exploded partial view of a preferred embodiment of the invention.

FIG. 1 illustrates a preferred embodiment of extrusion frame components 10 designed in accordance with the subject invention. The frame component presents three sets of tandem channels 12, each comprising an inner channel 14 and an outer channel 16. A connecting element 24 adapted to be inserted into the inner channels 14 of abutting frame components 10 is retained snugly therein by tightening screws 26 to compressively engage the arms 28 of the connecting element 24 against the floors 18 and lips 20 of the inner channels 14. The connecting element 24 may be provided with a notched region 29 which will enable it to slide along the inner channel 14 of the frame component 10 without interference between the lips 20, 22 of the tandem channel configuration 12 and the outwardly projecting arm 28 of the connecting element 24.

In the example shown, two tandem channel configurations 12 are provided along an inner side of the frame component 10 for versatility in mounting accessory strips 40. A third tandem channel configuration 12 may be provided along an upper side of the frame component 10, permitting the attachment of further frame components 10 oriented perpendicular to the connection illustrated. A fourth tandem channel configuration 12 (not shown) may be provided along a lower side of the frame component 10 for this purpose, and further tandem channel configurations 12 may be provided along an outer side of the frame component 10 to continue construction of the frame in a direction opposite to that illustrated. It will be recognized that the variations possible are numerous, and the number and placement of tandem channel configurations 12 is restricted only by the proportions of the frame component 10.

The tandem channel configuration 12 preferably comprises an inner channel 14 bounded by a floor 18, side walls and opposed lips 20, and an outer channel 16 bounded by the lips 20 of the inner channel 14, side walls and opposed outer lips 22. Preferably the outer channel 16 is relatively shallow, permitting a snug interlocking fit without requiring interlocking means 42 on accessory strips 40 to be unnecessarily thick.

Figure 2:
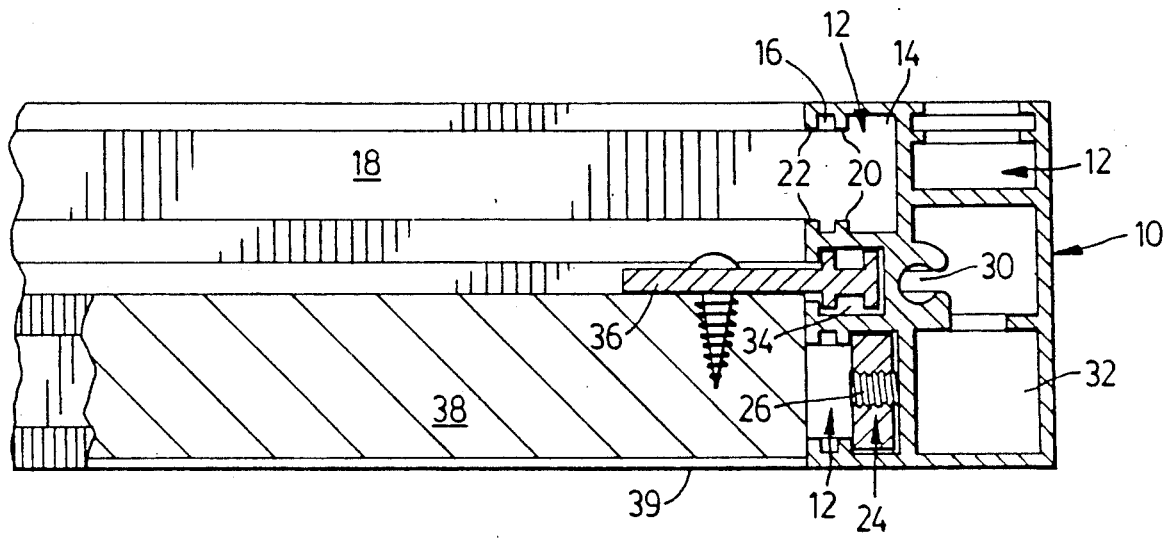
FIG. 2 is a partial cross-section of the embodiment illustrated in FIG. 1.

The frame component 10 may also include a generally central bore 30 adapted to receive a self-tapping screw through an end abutment, a relatively large rectangular channel 32 for slidably receiving a reinforcing element (not shown) for heavy duty applications, and a slip 34 for slidably receiving brackets 36 to which can be affixed a wooden panel 38 by screws or other known fastening means. As illustrated in FIG. 2, the slip 34, for aesthetic reasons, is preferably positioned such that the outer surface 39 of a wooden panel 38 affixed to brackets 36 engaged therein is substantially flush with a surface of the frame component 10.

FIGS. 5-10 illustrate some of the many possible variations of frame components 10 embodying a preferred embodiment of the subject invention. It will be seen that a frame component 10 can be designed to incorporate virtually any number of tandem channel configurations 12, preferably in conjunction with the central bore 30, reinforcing channel 32 and slip 34 described above, to enable frame components 10 to be assembled in various orientations relative to one another. Utilizing the connecting elements 24, and reinforcing elements if desired, a sturdy and rigid frame of virtually any shape can be assembled.

Suitably sized permanent panels may be affixed to the finished frame in a number of ways. For example, retaining brackets 36 positioned as required in the slip 34 along each side of the frame can be affixed to a panel 38. A panel may be affixed to a squared end of an extrusion by driving a self-tapping screw through the panel and into the central bore 30. The present invention further provides extruded accessory strips 40, preferably composed of plastic, adapted to perform a variety of functions useful in cabinets of this nature.

FIGS. 11 through 16 illustrate some of the possible configurations of accessory strips 40 for use in combination with the framing components 10 described above. Each accessory strip 40 is provided with interlocking means comprising a pair of longitudinally extending ribs 42, 44 adapted to engage between opposing lips 22 of the outer channel 16. One rib 42 preferably includes a blunted flange 43 adapted to nest snugly between one lip 20 of the inner channel 14 and the corresponding outer lip 22 of the outer channel 16. The other rib 44 includes a barb-shaped flange 45 adapted to nest snugly between the opposing lips 20, 22 bounding the outer channel 16.

Figure 4:
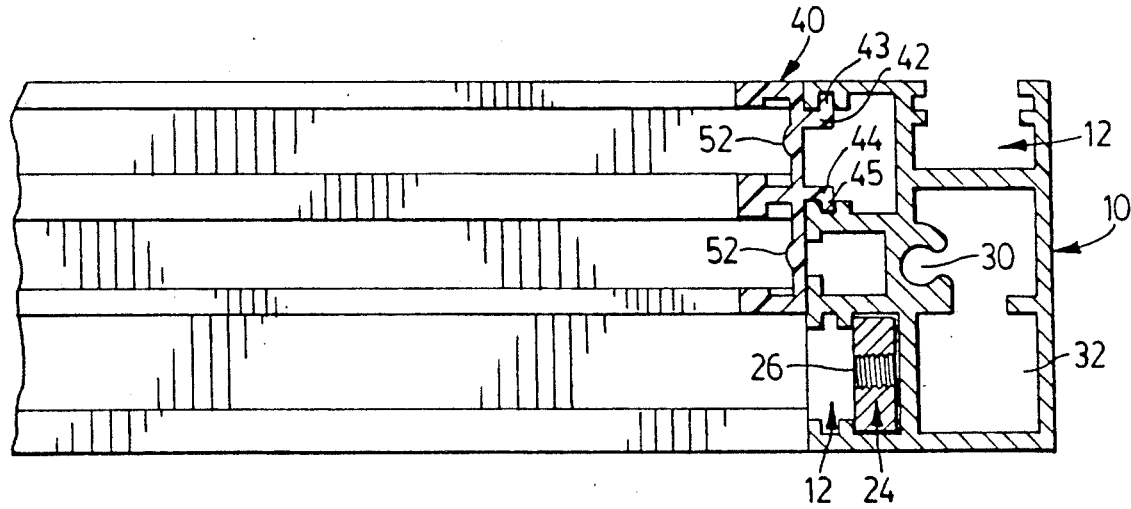
FIG. 4 is a partial cross-section of the embodiment illustrated in FIG. 3.
Figure 3:
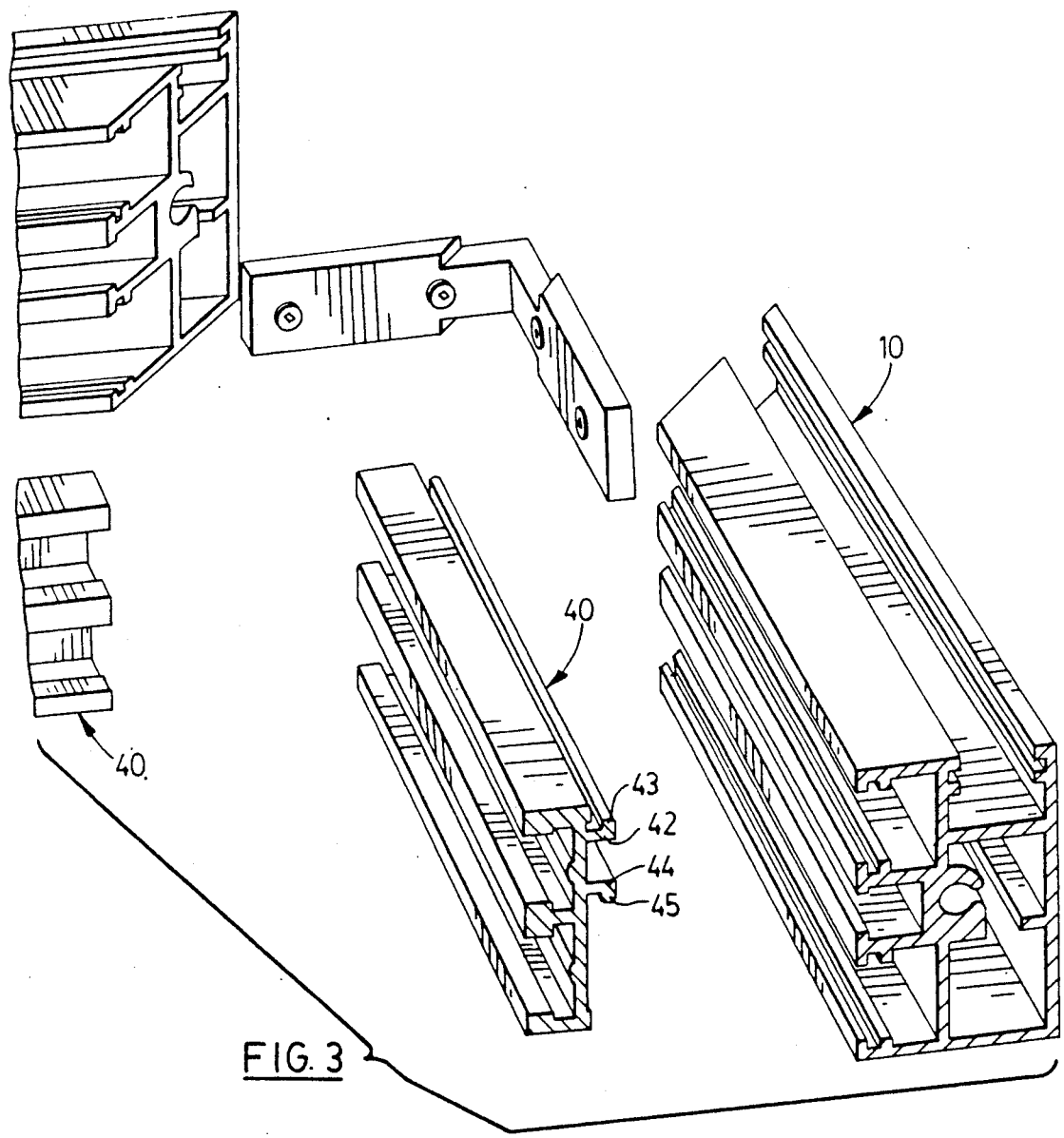
FIG. 3 is an exploded partial view of another embodiment of the invention.
Figure 5:
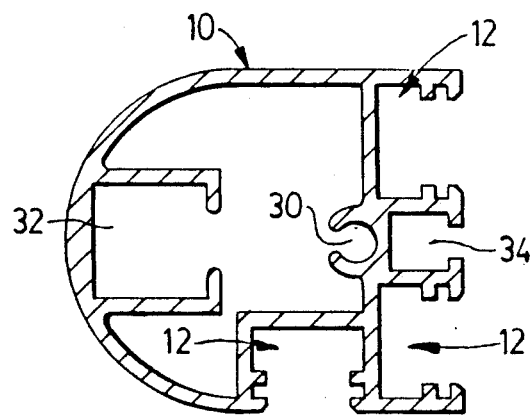
FIGS. 5-10 are cross-sectional views of various alternative frame component configurations embodying this invention.
Figure 6:
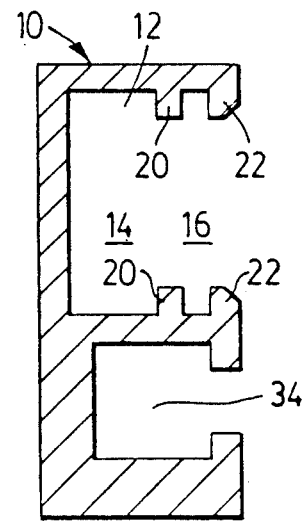
Figure 7:
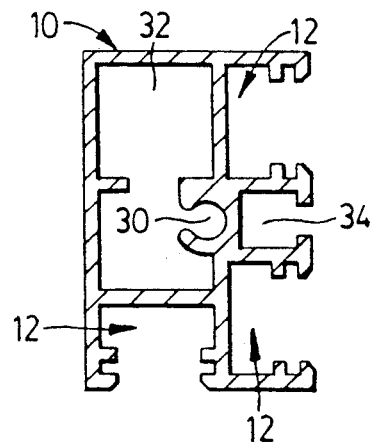
Figure 8:
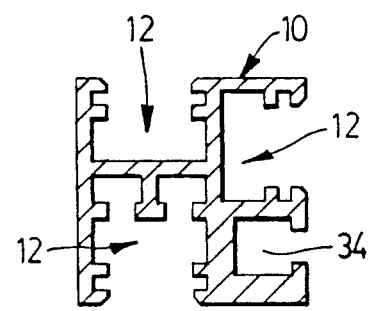
Figure 9:
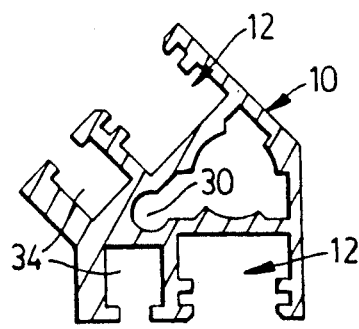
Figure 10:
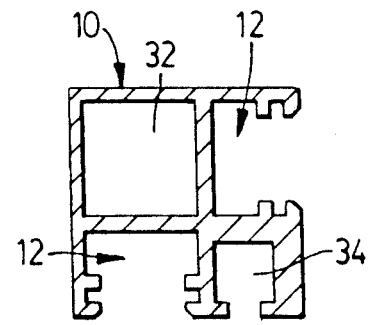

To attach the accessory strip 40 to the framing component 10 the blunted flange 43 is inserted into the outer channel 16 and seated between the lips 20, 22. The accessory strip 40 is then depressed against the framing component 10, camming the barb-shaped flange 45 against the corresponding outer lip 22 of the outer channel 16. Preferably the outer lip 22 is chamfered to assist this snap fit process. Preferably also the accessory strip 40 is composed of an integral strip of plastic or other durable resilient material to avoid permanent deformation of the rib 44 as the barb-shaped flange 45 cams against the outer lip 22 of the outer channel 16. The barb-shaped flange snaps into locking position between the lips 20, 22 when the accessory strip is fitted snugly against the frame component, as can be see in FIG. 4.

Once the accessory strip 40 is mounted on the framing component 10 in this fashion, it is difficult to remove, and is thus unlikely to become dislodged inadvertently. Accessory strips 40 can thus be made to suit many functions, without concern for dislodgement in the case of configurations for receiving moving parts such as sliding doors.

Figure 11:
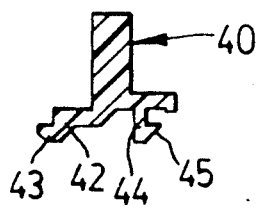
FIGS. 11-16 are cross-sectional views of various alternative configurations of accessory strips embodying this invention.
Figure 17:
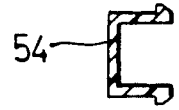
FIG. 17 is a cross-sectional view of a spacer for the configuration illustrated in FIG. 13.
Figure 12:
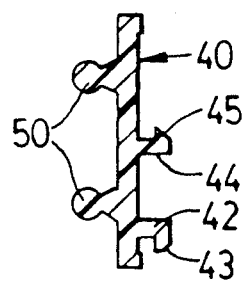
Figure 13:
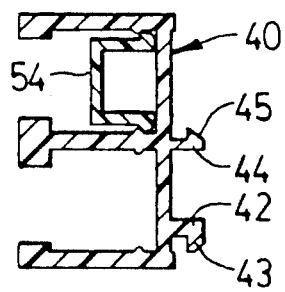
Figure 15:
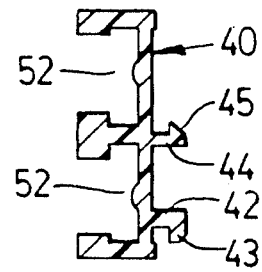
Figure 16:
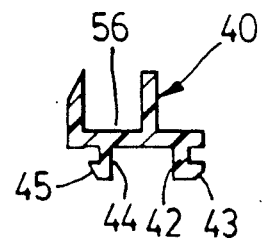

For example, FIG. 12 illustrates an accessory strip 40 having runners 50 for guiding the wheels of heavier sliding doors composed of glass or the like, while FIG. 15 illustrates an accessory strip 40 having channels 52 forming tracks to guide the lower edges of lighter weight sliding doors composed of, for example, cardboard. An upper door track accessory strip for sliding doors is illustrated in FIG. 13, and may include a spacer 54, illustrated in cross-section in FIG. 17, which can be mounted within the upper door track above a door to prevent the door from being lifted and removed in the closed position. FIG. 11 illustrates an accessory strip 40 for removably supporting the top panel of the cabinet, composed of glass for example, and FIG. 16 illustrates a further variation for permanently supporting a glass panel or the like in a glazing channel 56.

Figure 14:
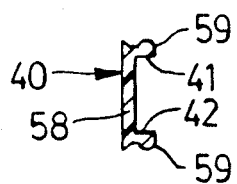

FIG. 14 illustrates a capping strip 58 for concealing a tandem channel configuration 12 where no particular accessory strip 40 is desired. The capping strip 58 may be formed with opposed beads 59, rather than flanges, to render it more easily removable in the event that a functional accessory strip 40 is desired to be installed at a subsequent time.

In each case, the accessory strip 40 may be mounted on the framing component 10 without regard to the positioning of connecting elements 24, which do not impinge upon the outer channel 16 and thus leave same available exclusively for the mounting of an accessory strip 40. It can further be seen that by combining accessory strips 40 of differing designs with basic framing components 10 suitable to the shape of the cabinet being constructed, virtually unlimited designs of cabinetry are available without the need for a separate configuration of framing component adapted to perform each function or permit each feature of the desired design.

Having described the subject invention by way of example, it will be obvious to those skilled in the art that certain modifications and adaptations may be made to the invention without departing from the scope thereof. It is intended to include all such modifications and adaptations as fall within the scope of the claims hereto.

I claim:

1. A frame component for framing cabinetry comprising a tandem channel configuration having an inner channel bounded by a floor, side walls and a pair of opposed inner lips and an outer channel bounded by the pair of opposed inner lips, side walls and a pair of opposed outer lips, an accessory strip including means for engaging a cabinet panel projecting from and extending longitudinally along a face of the accessory strip and interlocking means projecting from and extending longitudinally along an opposite face of the accessory strip comprising a pair of spaced apart ribs, each rib including an outwardly directed flange for engaging the outer channel of the frame component, and further including a connecting element having an arm engaging the inner channel of the frame component.

2. The combination defined in claim 1 in which one of the flanges is barb-shaped in cross-section.

3. The combination defined in claim 2 in which the other of the flanges is blunted in cross-section.

4. The frame components defined in claim 1 further including a cabinet panel engaged to the means for engaging a cabinet panel.

5. The frame components defined in claim 1 wherein means for engaging a cabinet panel includes tracks for guiding the lower edge of a sliding door.

6. The frame component defined in claim 1 in which means for engaging a cabinet panel includes a pair of spaced apart parallel members forming a glazing channel.

7. Frame components each comprising a tandem channel configuration having an inner channel bounded by a floor, side walls and a pair of opposed inner lips and an outer channel bounded by the pair of opposed inner lips, side walls and a pair of opposed outer lips, accessory strips each having an inner face and an outer face including means for engaging a cabinet panel projecting from the outer face of each accessory strip and extending longitudinally along the accessory strip, and interlocking means projecting from the inner face of each accessory strip and extending longitudinally along the accessory strip comprising a pair of spaced apart ribs, each rib including an outwardly directed flange for engagement in the outer channel of the frame component, connecting elements each having a pair of arms provided with securing means engaging the inner channels of adjacent frame components, and a cabinet panel engaged to the means for engaging a cabinet panel.

8. The frame components defined in claim 7 in which one of the flanges is barb-shaped in cross-section.

9. The frame components defined in claim 8 in which the other of the flanges is blunted in cross-section.

10. The frame components defined in claim 7 wherein means for engaging a cabinet panel includes tracks for guiding the lower edge of a sliding door.

11. The frame components defined in claim 7 in which means for engaging a cabinet panel includes a pair of spaced apart parallel members forming a glazing channel.

12. Frame components each having a tandem channel configuration having an inner channel bounded by a floor, side walls and a pair of opposed inner lips and an outer channel bounded by the pair of opposed inner lips, side walls and a pair of opposed outer lips, accessory strips including means for engaging a cabinet panel projecting from a face of the accessory strip, and interlocking means projecting from an opposite face of the accessory strip comprising a pair of spaced apart ribs, each rib including an outwardly directed flange for engaging the outer channel of the frame component, and connecting elements each having a pair of arms provided with securing means for engaging the inner channels of adjacent frame components, whereby each arm of a connecting element is compressively engaged in the inner channel of a frame component and the interlocking means of an accessory strip are engaged in the outer channel of the frame component thereby securing the accessory strip to the frame component.

13. The frame components defined in claim 12 further including a cabinet panel engaged to the means for engaging a cabinet panel.

14. The frame components defined in claim 12 wherein means for engaging a cabinet panel includes tracks for guiding the lower edge of a sliding door.

15. The frame components defined in claim 12 in which means for engaging a cabinet panel includes a pair of spaced apart parallel members forming a glazing channel.

* * * * *